United States Patent [19]
Huvey

[11] Patent Number: 5,377,401
[45] Date of Patent: Jan. 3, 1995

[54] PROCESS FOR MANUFACTURING A METALLIC TANK
[75] Inventor: Michel Huvey, Bougival, France
[73] Assignee: Institut Francais du Petrole, Rueil Malmaison, France
[21] Appl. No.: 99,587
[22] Filed: Jul. 30, 1993
[30] Foreign Application Priority Data
  Jul. 31, 1992 [FR] France ............................. 92 09643
[51] Int. Cl.6 ............................................. B21D 39/00
[52] U.S. Cl. ...................................... 29/523; 29/522.1
[58] Field of Search ........... 29/506, 507, 523, 890.051, 29/522.1; 413/78
[56] References Cited
U.S. PATENT DOCUMENTS

| 2,106,495 | 1/1938 | Debor . | |
|---|---|---|---|
| 2,222,762 | 11/1940 | Debor et al. . | |
| 3,064,344 | 11/1962 | Arne | 29/523 |
| 3,114,968 | 12/1963 | Rudelick | 29/890.051 |
| 4,332,073 | 6/1982 | Yoshida et al. | 29/523 |
| 4,388,752 | 6/1983 | Vinciguerra et al. | 29/523 |

FOREIGN PATENT DOCUMENTS
2669396 5/1992 France .
 604636 10/1934 Germany .

Primary Examiner—Mark Rosenbaum
Assistant Examiner—David P. Bryant
Attorney, Agent, or Firm—Antonelli, Terry, Stout & Kraus

[57] ABSTRACT

A process for manufacturing a metallic tank involves placing a metallic inner sheath of average plastic strain having two ends separated via a cylindric zone within a cylindric corrugated tube having hollow outer parts provided with reinforcing elements and expanding the metallic inner sheath by compression to conform to the corrugated tube. In the process, a tube for preventing longitudinal buckling of the corrugated tube is placed around the assembly of the corrugated tube and the metallic sheath.

13 Claims, 4 Drawing Sheets

PROCESS FOR MANUFACTURING A METALLIC TANK

FIELD OF THE INVENTION

The present invention relates to a process for manufacturing a resistant metallic tank capable of withstanding high pressures and having a low weight.

The process described in accordance with the present invention allows manufacture of a light structure with a low cost price and quick manufacturing, and enables easy adaptation of the structures or self-adaptation to future utilizations.

This process is more particularly applied to the forming or shaping of a sheath consisting of a material having an average plastic strain, more particularly a metal of average plastic strain. In the text hereafter, a material of average plastic strain is understood to be a material whose characteristics range between the characteristics of materials known as "brittle" and materials of very high plastic strain, for example a strain ranging between 10 and 30%.

BACKGROUND OF THE INVENTION

French patent application (FR-91/01,193) describes a process for manufacturing a metallic tank which requires the use of metals of very high plastic strain of relatively high cost or of very low tensile strength.

The basic idea developed in the present invention is to use a press and a die for forming the metallic sheath, the die consisting, for its cylindric part, of a reinforced corrugated thermoplastic tube described previously in patent FR-2,553,860, the tube and the die fitting into each other after manufacturing, the metallic sheath for example being located inside the reinforced corrugated tube constituting the die.

The advantage of the new process according to the present invention is to use materials of average plastic strain and of a higher resistance than materials of very high plastic strain. The manufacturing cost is therefore decreased by using less material, a less costly material, and the final structure of the tank is lightened.

SUMMARY OF THE INVENTION

The process for manufacturing the tank according to the present invention comprises the following stages in combination:

a) providing a corrugated tube whose hollow outer parts are provided with a reinforcing element, b) placing inside the corrugated tube a metallic inner sheath of average plastic strain comprising two bottoms separated by a cylindric zone of a length at least equal to the length of said corrugated tube, said inner sheath being provided with at least one opening in at least one of its bottoms, and c) forming the tank by exerting a longitudinal pressure on the inner sheath.

Provision of the tube may comprise the following stages:

reinforcing circumferentially said corrugated tube by supplying the hollow outer parts of said tube, on at least part of their height H, with a circumferential reinforcing element, then hardening the circumferential reinforcing element, and stretching the reinforced corrugated tube and maintaining it in its new stretched shape.

An element such as a tube preventing longitudinal buckling during the forming process may be placed around the reinforced corrugated tube.

The forming stage may be performed by shortening the overall length of the assembly consisting of the corrugated tube, the inner sheath of average plastic strain and the outer tube preventing longitudinal buckling.

The forming stage may comprise the following operations:

- introducing a liquid under pressure into the inner sheath via a liquid inlet so as to carry off the air contained in the inner sheath. A pressure build-up is thus obtained in the tank,

- closing the liquid inlet,

- displacing at least one a mobile plates of the press by controlling the liquid discharge out of the sheath.

The liquid is discharged out of the tank for example by following a predetermined optimum discharge curve.

Discharge of the liquid is controlled for example by measuring at least one parameter characteristic of the state of the forming operation.

Thus, the characteristic parameter used may me the measure of the pressure prevailing in the inner sheath, of the pressure measured at the level of the piston or of the displacement of the piston, or the work of the piston.

A tube stiff against flexion may be used to prevent longitudinal buckling of the assembly consisting of the corrugated tube and the inner sheath.

Circumferential reinforcing elements made from a fiber-reinforced hardenable resin are used, and each one of them is subjected to a treatment allowing hardening of the composition.

Similarly, circumferential reinforcing elements made from a photocurable resin, which is hardened by exposing it to an ultraviolet ray-generating lamp, may be used.

Circumferential reinforcing elements made from a heat-convertible resin, which is maintained in the hardened stage under conditions allowing cross-linkage to take place, may also be used.

The resin may be a thermosetting resin which is hardened by heating up to a temperature allowing hardening of the resin.

The present invention further relates to a device for forming an inner sheath consisting of two parts suited to the shape of the bottoms of the inner sheath and a longitudinal part characterized in that the longitudinal part consists of a reinforced corrugated tube whose hollow outer parts are provided with reinforcing elements 3, said reinforcing elements 3 being in contact with the hollow of said hollow outer parts.

The device may comprise in combination a press allowing forming of the inner sheath and application of the cylindric walls of the inner sheath on the reinforced corrugated tube.

BRIEF DESCRIPTION OF THE DRAWINGS

Other features and advantages of the invention will be clear from reading the description hereafter with reference to the accompanying drawings given by way of non limitative examples, illustrating various embodiments and in which.

DESCRIPTION OF THE PREFERRED EMBODIMENTS

Forming of the inner metallic sheath of the tank is achieved by means of a reinforced mold obtained according to the circumferential reinforcing method described in patent application FR-90/14,490 which will be described hereinafter.

Figure 1:
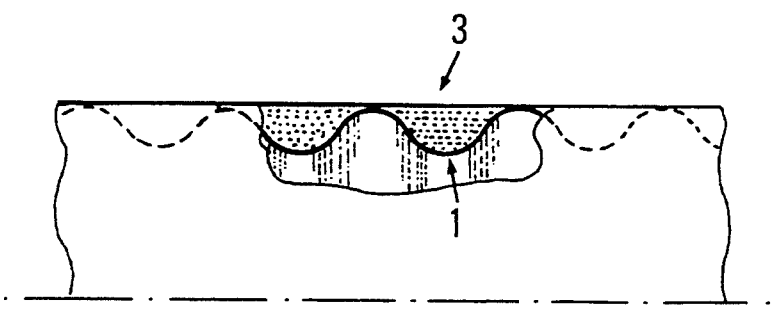
FIG.1 describes a mold with a reinforced corrugated wall which is used for manufacturing the part of the longitudinal die of the press.

This mold is obtained from a reinforced corrugated cylindric tube 1, for example made of plastic, such as polypropylene (FIG. 1). The outer surface of the tube, consisting of hollow or concave and raised or convex parts, has a shape allowing the desired final corrugation to be obtained.

Figure 2:
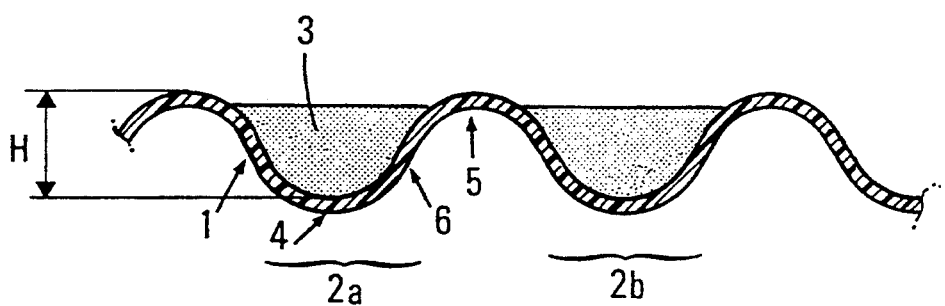
FIG. 2 shows a portion of the corrugated cylindric zone of the mold shown in FIG. 1.

A longitudinal section of the corrugated tube consists of successive circle portions alternately concave and convex 4, 5, respectively, which are connected directly to one another or which may be separated by truncated or flattened portions 6. The tube constituted thereby may be ringed or helicoidal. An operation of circumferential reinforcement of tube 1 is then performed, which consists in filling its hollow portions 2a and 2b (FIG.2) with fiber-reinforced resin 3, which is thereafter hardened by a hardening treatment known by specialists.

Tube 1 provided with its resin reinforcements 3 is then stretched (FIG. 3) and maintained in its new position of stretch by an appropriate thermal treatment.

Various well-known methods may be used to stretch tube 1 without changing the initial shape of reinforcing elements 3. Inflatable sleeves (not shown) may notably be introduced at each end of the tube so as to rest against the inner walls of the corrugated tube and, through the pressure increase, to force the tube to stretch as it is well-known by specialists.

Figure 3:
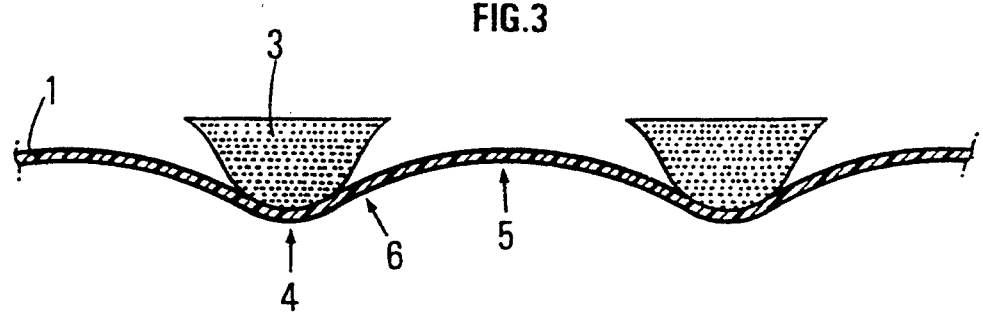
FIG. 3 shows the corrugated tube of FIG. 1 stretched for being used as the longitudinal part of the die.

The reinforced corrugated tube is stretched until the desired length, which is the length of the metallic inner cylindric zone to be formed, is obtained. At the end of this stage, the reinforced corrugated tube is nearly smooth internally. The reinforcing elements 3, whose shape has not been modified, jut out above the new height of the corrugations of the tube, as shown in FIG. 3. The reinforcing elements are in contact with the corrugated tube only through their lower parts.

The corrugated tube is then maintained in its position of elongation by means, for example, of a thermal treatment at a temperature value lower than the value which would cause a vitreous transition.

If the separation of the reinforcing elements wound in the adjacent hollow parts of the tube has not been achieved before, during the winding operations for example, this operation may be performed during the stretching stage.

Figure 4:
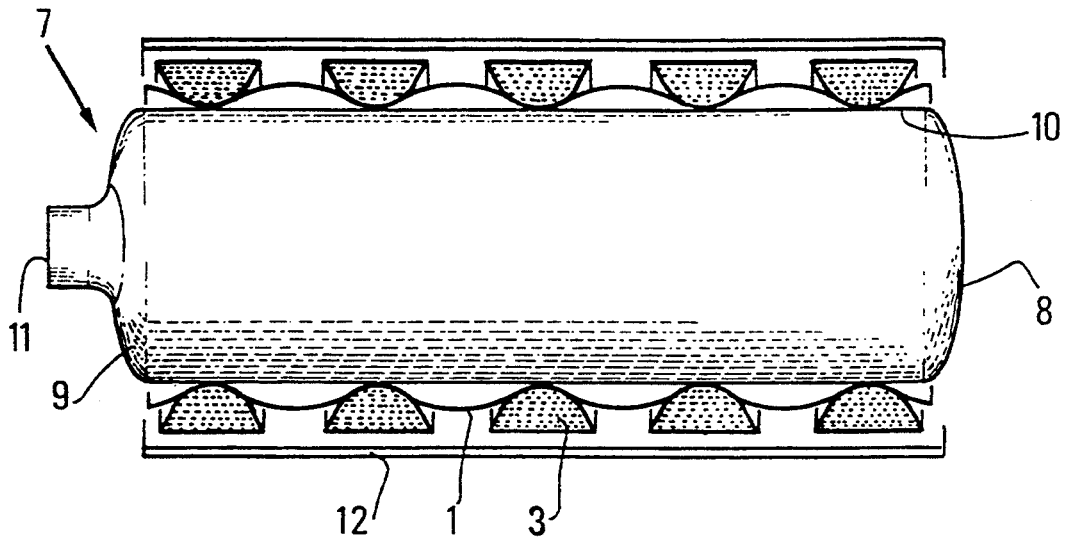
FIG. 4 shows the lay-out of the elements before they are placed in the press.

FIG. 4 shows the lay-out of the elements before they are set in the press.

An inner sheath 7 consisting of two ends or end walls 8, 9 of equal thickness, connected to each other by a cylindric zone 10, is inserted into the reinforced corrugated tube obtained through the stages described previously. The inner sheath is for example made from a metal of average plastic strain.

Ends 8, 9 have an ellipsoid or hemispherical shape. Although they may be made from a different material, the same material as that used for the cylindric part is preferably utilized so as to facilitate the achievement of seal welds having mechanical qualities equivalent to those of the cylindric zone.

At least one of the ends of the inner sheath is provided with an opening and equipped with a tight closing system 11 such as a valve or a plug.

The assembly constituted thereby is slipped into a tube 12. The annular space between the tube 12 and the projecting elements 3 is selected to be small enough to prevent the corrugated tube from buckling when the metallic inner sheath expands during the forming process.

The various elements: metallic inner sheath 7, reinforced corrugated tube and tube 12 for preventing buckling being fitted together, the assembly is transferred into a press.

Figure 5:
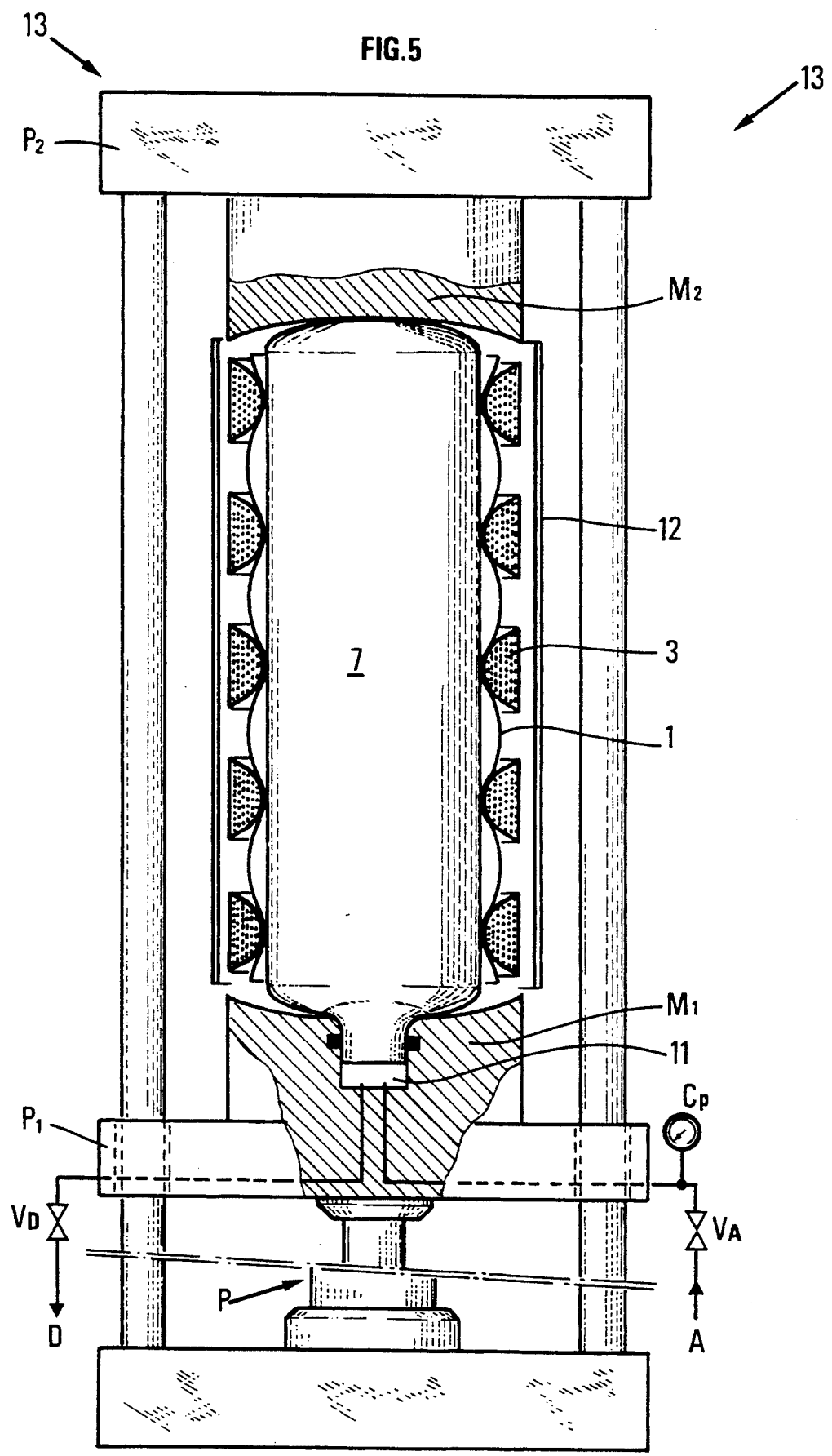
FIG. 5 shows all the elements placed in the press before forming.
Figure 6:
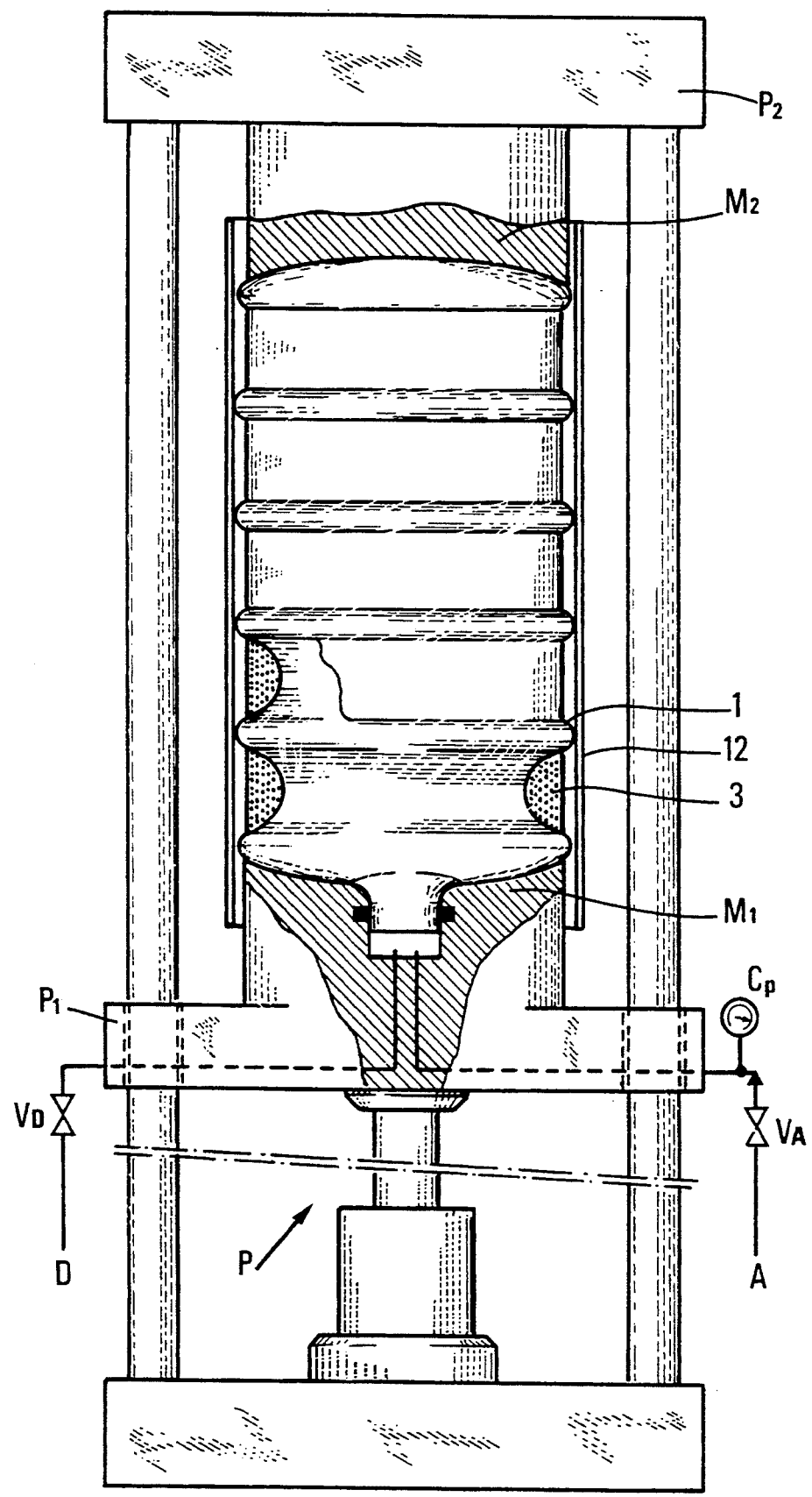
FIG. 6 shows the tank obtained at the end of the manufacturing process.

FIG. 5 shows the assembly heretofore described positioned in a press 13 comprising a frame on which two plates P1, P2 are positioned, and at least one of the two plates may be movable.

The forming die located inside the press consists of two parts M1, M2, each of the parts having a shape suited to the shape of the ends desired for the final tank, the two parts being separated by the assembly comprising the reinforced corrugated tube and tube 12 for preventing buckling. A piston P is connected to a mobile plate, for example to plate P1.

A liquid supply line A and an outlet or discharge line D controlled by a discharge valve VD are introduced through closing means 11. A pressure sensor Cp is arranged inside the metallic sheath 7 in order to measure the pressure therein at any time. It is also possible to measure the pressure of the fluid behind the piston of the press in case a hydraulic press is used, or to measure the stress exerted by the press on the assembly constituted by the inner sheath, the corrugated tube and the tube for preventing buckling. The stroke or displacement of the piston may also be followed.

The operation of shaping or forming of the metallic inner sheath is, for example, performed with the following stages.

The fluid supply line A is connected, by means of a control valve VA, to means for supplying liquid under pressure (not shown in the figure). Discharge line D is connected to the open atmosphere during this time.

The means for supplying liquid may be, for example, a source of water if the tank is made of a water-resistant metal, such as stainless steel, or of oil in case of a metal sensitive to water, such as non-protected standard steel.

The air is first driven out of the inner sheath 7 until it nearly contains only liquid under pressure.

The liquid supply is then stopped by means of valve VA.

The mobile plate P1 is displaced so as to shorten the tank and the pressure increase resulting therefrom forces the sheath to expand crosswise outside the resistance zones constituted by the longitudinal reinforcing rings, i.e. in the spaces between them and also at the level of the ends which eventually follow the shape of the two terminal dies M1, M2.

When the pressure of the liquid in the sheath reaches a determined value, discharge is started by opening valve VD intermittently so that the forming of the corrugations occurs without any excessive strain of the metallic material.

Figure 7:
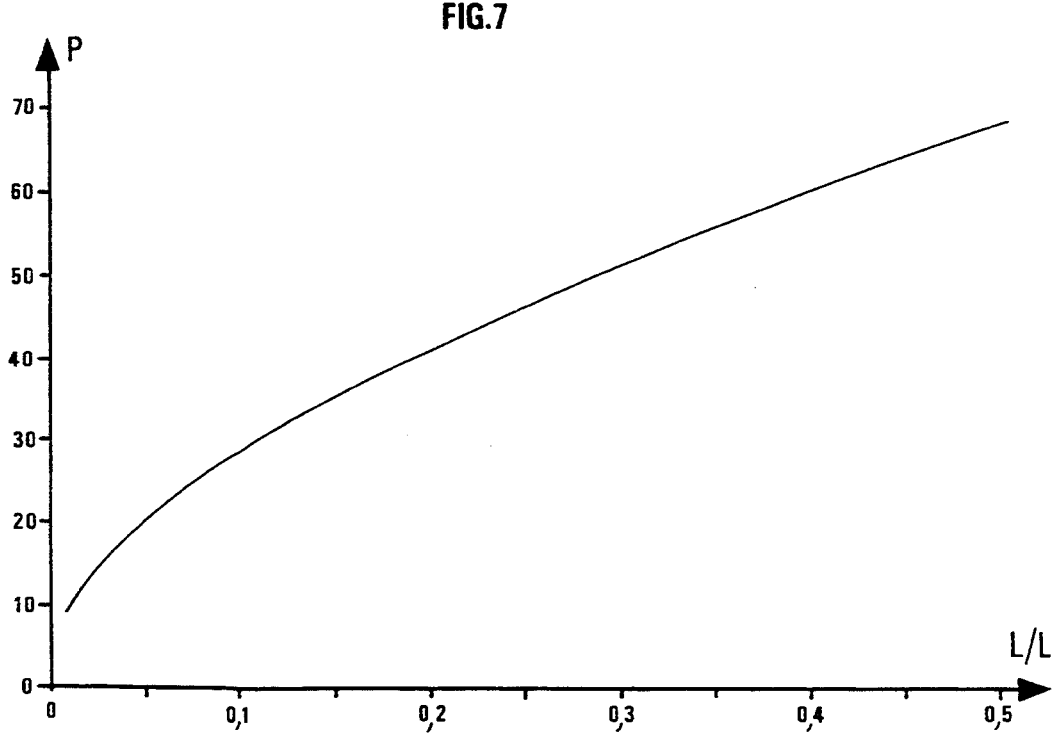
FIG. 7 shows a forming curve.

The liquid is discharged by following a predetermined forming curve (FIG.7). This forming curve has been obtained with previous tests during which the value of the pressure prevailing in the inner sheath as a function of the piston displacement has been measured, and the main curve allowing a tank having the required characteristics to be obtained has been selected from various plotted curves.

The operation of discharge of the liquid and of displacement of at least one plate is continued until the shape desired for the inner sheath and the final tank constituted by inner sheath 7 and the reinforced corrugated tube fitted into each other is obtained. At the end of the shaping operation, the reinforced corrugated tube takes its initial, non stretched form again above which the reinforcing elements no longer jut out.

The operation of discharge of the liquid contained in the inner sheath is controlled as follows. The value of the pressure which should prevail in the tank for a given strain, giving a tank of determined characteristics, is well-known through the optimum discharge curve used as a reference curve.

The opening of the discharge valve VD is adjusted so that the pressure follows the optimum discharge curve or main curve at best.

Without departing from the scope of the invention, it is possible to use a programmable automation or any other electronic piloting device to control automatically the forming operation so that the pressure of the liquid follows the predetermined optimum discharge curve.

Without departing from the scope of the present invention, an "accordion" type structure may be used. In this case, the hollow portion may be filled substantially over its total height H. Similarly, the corrugation may be sinusoidal or approximately so.

Similarly, without departing from the scope of the invention, it is possible to use two concentric lines connected to valves equipping the end of the inner sheath or the liquid supply line may be positioned on one of the ends and the discharge line on the other end of the tank.

Of course, the process whose description has been given by way of non limitative examples may be provided with various modifications and/or additions without departing from the scope of the invention.

I claim:

1. A process for manufacturing a metallic tank which comprises the following stages:
   a) providing a corrugated tube having a plurality of hollow outer parts, each part provided with a reinforcing element;
   b) placing inside the corrugated tube a metallic inner sheath of average plastic strain, said sheath comprising two ends separated by a cylindric zone of a length at least equal to the length of said corrugated tube, said inner sheath being provided with at least one opening in at least one of the ends; and
   c) forming the tank by exerting a longitudinal pressure on the ends of the inner sheath to place the sheath under compression and to expand the cylindric zone into contact with the corrugated tube thereby conforming the cylindric zone of the sheath to the shape of the corrugated tube.

2. A process according to claim 1, wherein provision of the corrugated tube comprises the following stages:
   circumferentially reinforcing said corrugated tube by providing each of the hollow outer portions of the tube on at least part of its height H, with a circumferential reinforcing element made of a hardenable material; then
   hardening the circumferential reinforcing element; and
   longitudinally stretching the reinforced corrugated tube and maintaining the corrugated tube in its stretched shape.

3. A process according to claim 2, wherein the corrugated tube is formed of a plastic which can be stretched by elongation in an axial direction.

4. A process according to claim 1, wherein a tube is placed around the corrugated tube for preventing longitudinal buckling of the corrugated tube.

5. A process as claimed in claim 1, wherein the forming stage is performed by reducing the overall length of the assembly consisting of the corrugated tube and the inner sheath.

6. A process according to claim 1, wherein the forming stage comprises the following operations:
   introducing a liquid under pressure into the inner sheath via said at least one opening so as to displace air contained in the inner sheath;
   closing the at least one opening;
   providing a press having two plates, at least one of the plates being a mobile plate;
   engaging each of the two plates with a respective end of the sheath; and
   displacing said at least one mobile plate of the press while controlling liquid discharge out of the sheath.

7. A process according to claim 6, wherein the liquid is discharged out of the sheath by following a predetermined optimum discharge curve plotted from previous tests of liquid discharge to avoid excessive strain of the metallic sheath.

8. A process according to claim 6, wherein the liquid discharge is controlled by measuring at least one parameter characteristic of a state of the forming operation.

9. A process according to claim 1, which further comprises preventing longitudinal buckling of the assembly consisting of the corrugated tube and the inner sheath by positioning a stiff tube around the corrugated tube.

10. A process according to claim 1, wherein the circumferential reinforcing elements are made from a fiber-reinforced resin and each of the elements is subjected to a treatment allowing hardening of the resin.

11. A process according to claim 1, wherein the circumferential reinforcing elements are made from a photocurable resin which is hardened by exposing the resin to an ultraviolet ray-generating lamp.

12. A process according to claim 1, wherein the circumferential reinforcing elements are made from a heat-convertible resin which is maintained in a hardened stage under conditions allowing crosslinking to take place within the resin.

13. A process according to claim 1, wherein the circumferential reinforcing elements are made of a thermosetting resin and each of the elements are hardened by heating to a temperature allowing hardening of the resin.

* * * * *